(12) United States Patent
Fedor et al.

(10) Patent No.: US 8,794,903 B2
(45) Date of Patent: *Aug. 5, 2014

(54) SHROUDED WIND TURBINE SYSTEM WITH YAW CONTROL

(75) Inventors: John W. Fedor, Eastlake, OH (US); Mark L. Cironi, Akron, OH (US)

(73) Assignee: Green Energy Technologies, LLC, Akron, OH (US)

( * ) Notice: Subject to any disclaimer, the term of this patent is extended or adjusted under 35 U.S.C. 154(b) by 90 days.

This patent is subject to a terminal disclaimer.

(21) Appl. No.: 13/431,206

(22) Filed: Mar. 27, 2012

(65) Prior Publication Data

US 2012/0183387 A1     Jul. 19, 2012

Related U.S. Application Data

(63) Continuation of application No. 11/845,094, filed on Aug. 27, 2007, now Pat. No. 8,257,019.

(60) Provisional application No. 60/871,135, filed on Dec. 21, 2006.

(51) Int. Cl.
*F03D 1/04* (2006.01)

(52) U.S. Cl.
USPC ............ 415/4.3; 415/4.5; 415/30; 415/118; 415/220; 416/44; 416/170 R; 416/189; 416/61

(58) Field of Classification Search
USPC ............... 415/4.3, 4.5, 30, 118, 120; 416/44, 416/170 R, 189, 61; 290/44, 55
See application file for complete search history.

(56) References Cited

U.S. PATENT DOCUMENTS

| | | | |
|---|---|---|---|
| 984,599 A | 2/1911 | Pichault | |
| 2,137,559 A | 11/1938 | Algee | |
| 3,339,078 A | 8/1967 | Crompton | |
| 3,883,750 A * | 5/1975 | Uzzell, Jr. ...................... | 290/55 |
| 4,021,135 A | 5/1977 | Pedersen | |
| 4,075,500 A | 2/1978 | Oman | |
| 4,086,498 A | 4/1978 | Szoeke | |
| 4,132,499 A | 1/1979 | Igra | |
| 4,140,433 A | 2/1979 | Eckel | |
| 4,213,734 A | 7/1980 | Lagg | |
| 4,258,271 A | 3/1981 | Chappell | |

(Continued)

FOREIGN PATENT DOCUMENTS

| | | |
|---|---|---|
| GB | 1450348 | 9/1976 |
| GB | 2230565 | 10/1990 |

(Continued)

OTHER PUBLICATIONS

International Search Report and Written Opinion dated Nov. 10, 2008 for the related International Application No. PCT/US2008/074532.

(Continued)

*Primary Examiner* — Ninh H Nguyen
(74) *Attorney, Agent, or Firm* — Tucker Ellis LLP

(57) ABSTRACT

A wind energy systems includes a shroud for each turbine. The shroud is adapted to direct and accelerate wind towards the turbine. A strong adaptable support assembly is provided for securing turbines to a structure. An air glide yaw assembly facilitates rotational movement of the structure allowing the turbines to face oncoming wind. The turbine blades are optimized for use with a shroud.

19 Claims, 12 Drawing Sheets

(56) References Cited

U.S. PATENT DOCUMENTS

| | | | |
|---|---|---|---|
| 4,309,146 A | 1/1982 | Hein | |
| 4,323,331 A | 4/1982 | Schachle | |
| 4,324,985 A | 4/1982 | Oman | |
| 4,411,588 A * | 10/1983 | Currah, Jr. | 415/220 |
| 4,482,290 A | 11/1984 | Foreman | |
| 4,616,973 A | 10/1986 | Souchik, Jr. | |
| 4,684,316 A | 8/1987 | Karlsson | |
| 4,720,640 A | 1/1988 | Anderson | |
| 4,781,522 A | 11/1988 | Wolfram | |
| 5,464,320 A | 11/1995 | Finney | |
| 5,669,758 A | 9/1997 | Williamson | |
| 6,053,700 A | 4/2000 | Fosdick | |
| 6,064,123 A | 5/2000 | Gislason | |
| 6,246,126 B1 * | 6/2001 | Van Der Veken et al. | 290/55 |
| 6,382,904 B1 | 5/2002 | Orlov | |
| D487,060 S | 2/2004 | Ehrenberger | |
| 6,710,468 B1 | 3/2004 | O'Shanahan | |
| 6,756,696 B2 * | 6/2004 | Ohya et al. | 290/55 |
| 6,786,697 B2 | 9/2004 | O'Connor | |
| 6,849,965 B2 | 2/2005 | Le Nabour | |
| 6,887,031 B1 | 5/2005 | Tocher | |
| 6,903,466 B1 | 6/2005 | Mercier | |
| 6,981,839 B2 | 1/2006 | Fan | |
| 7,018,166 B2 | 3/2006 | Gaskell | |
| 7,094,018 B2 | 8/2006 | Grubb | |
| 7,118,344 B2 | 10/2006 | Wieser | |
| 7,147,428 B2 | 12/2006 | Lamont | |
| 7,160,083 B2 | 1/2007 | Pierce | |
| 7,176,584 B1 | 2/2007 | Green | |
| 7,220,096 B2 | 5/2007 | Tocher | |
| 7,230,348 B2 | 6/2007 | Poole | |
| 7,352,075 B2 * | 4/2008 | Willey et al. | 290/44 |
| 7,365,448 B2 | 4/2008 | Stephens | |
| 7,400,057 B2 | 7/2008 | Sureshan | |
| 7,550,864 B2 | 6/2009 | Anderson | |
| 7,569,943 B2 * | 8/2009 | Kovach et al. | 290/44 |
| 7,633,177 B2 | 12/2009 | Platt | |
| 7,679,206 B1 | 3/2010 | Green | |
| 7,976,269 B2 | 7/2011 | Presz, Jr. | |
| 7,980,811 B2 | 7/2011 | Presz, Jr. | |
| 8,021,100 B2 | 9/2011 | Presz, Jr. | |
| 8,188,611 B2 | 5/2012 | Farb | |
| 2002/0047071 A1 | 4/2002 | Illingworth | |
| 2003/0133783 A1 | 7/2003 | Brock | |
| 2003/0175109 A1 | 9/2003 | Brock | |
| 2004/0096327 A1 | 5/2004 | Appa | |
| 2005/0002783 A1 | 1/2005 | Hiel | |
| 2008/0258467 A1 | 10/2008 | Wilson | |
| 2009/0087308 A2 | 4/2009 | Presz, Jr. | |
| 2009/0230691 A1 | 9/2009 | Presz, Jr. | |
| 2009/0256359 A1 | 10/2009 | Bruk | |
| 2009/0263244 A1 | 10/2009 | Presz, Jr. | |
| 2009/0317231 A1 | 12/2009 | Presz, Jr. | |
| 2010/0028132 A2 | 2/2010 | Presz, Jr. | |
| 2010/0068029 A1 | 3/2010 | Presz, Jr. | |
| 2010/0086393 A1 | 4/2010 | Presz, Jr. | |
| 2010/0119361 A1 | 5/2010 | Presz, Jr. | |
| 2010/0143092 A1 | 6/2010 | Hjort | |
| 2010/0247289 A1 | 9/2010 | Presz, Jr. | |
| 2010/0270802 A1 | 10/2010 | Presz, Jr. | |
| 2011/0042952 A1 | 2/2011 | Ohya | |
| 2012/0086216 A1 | 4/2012 | Ohya | |

FOREIGN PATENT DOCUMENTS

| | | |
|---|---|---|
| JP | 5167943 | 5/1976 |
| JP | 59007784 | 1/1984 |
| JP | 2001055969 | 2/2001 |
| JP | 2002213343 | 7/2002 |
| JP | 2003003944 | 1/2003 |
| JP | 2003278635 | 10/2003 |
| JP | 2004052720 | 2/2004 |
| JP | 2010101276 | 5/2010 |
| JP | 2011256862 | 12/2011 |
| RU | 2006663 | 1/1994 |
| WO | WO2008017106 | 2/2008 |
| WO | WO2010011158 | 1/2010 |

OTHER PUBLICATIONS

Jischke, M.C. "On the Aerodynamics of Windmill Blades" Proceedings of the Oklahoma Academy of Science, vol. 56, pp. 121-124; 1976.

Green Energy, "Wind Energy for Your World", 2012.

Ohya et al, "Development of Shrouded Wind Turbines with Wind-Lens Technology", EWEA, 2011.

Highlighting Japan, "Embracing New Energy", Jul. 2011, vol. 5, No. 3.

Ohya et al, "A Highly Efficient Wind Turbine with Wind-Lens Shroud".

Ohya et al, "A Shrouded Wind Turbine Generating High Output Power with Wind-Lens Technology", Energies, 2010, vol. 3, pp. 634-649.

* cited by examiner

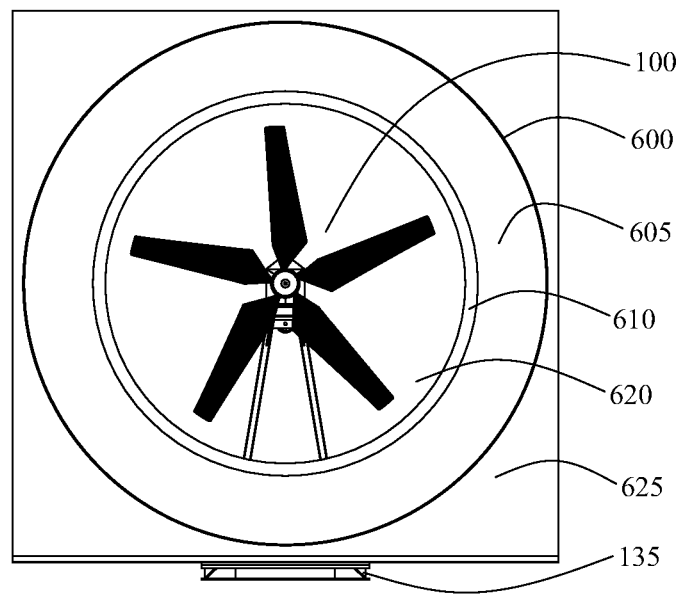
FIGURE 6
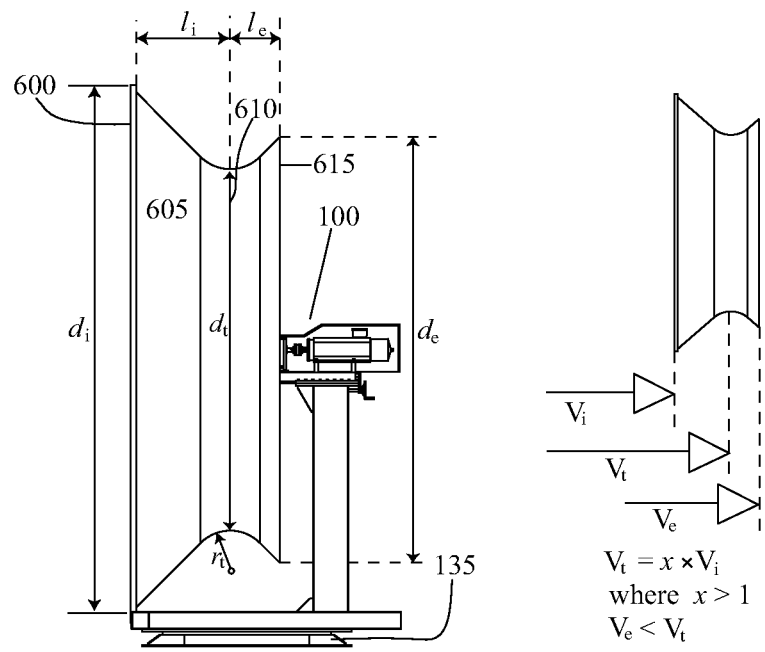
FIGURE 6A
FIGURE 6B

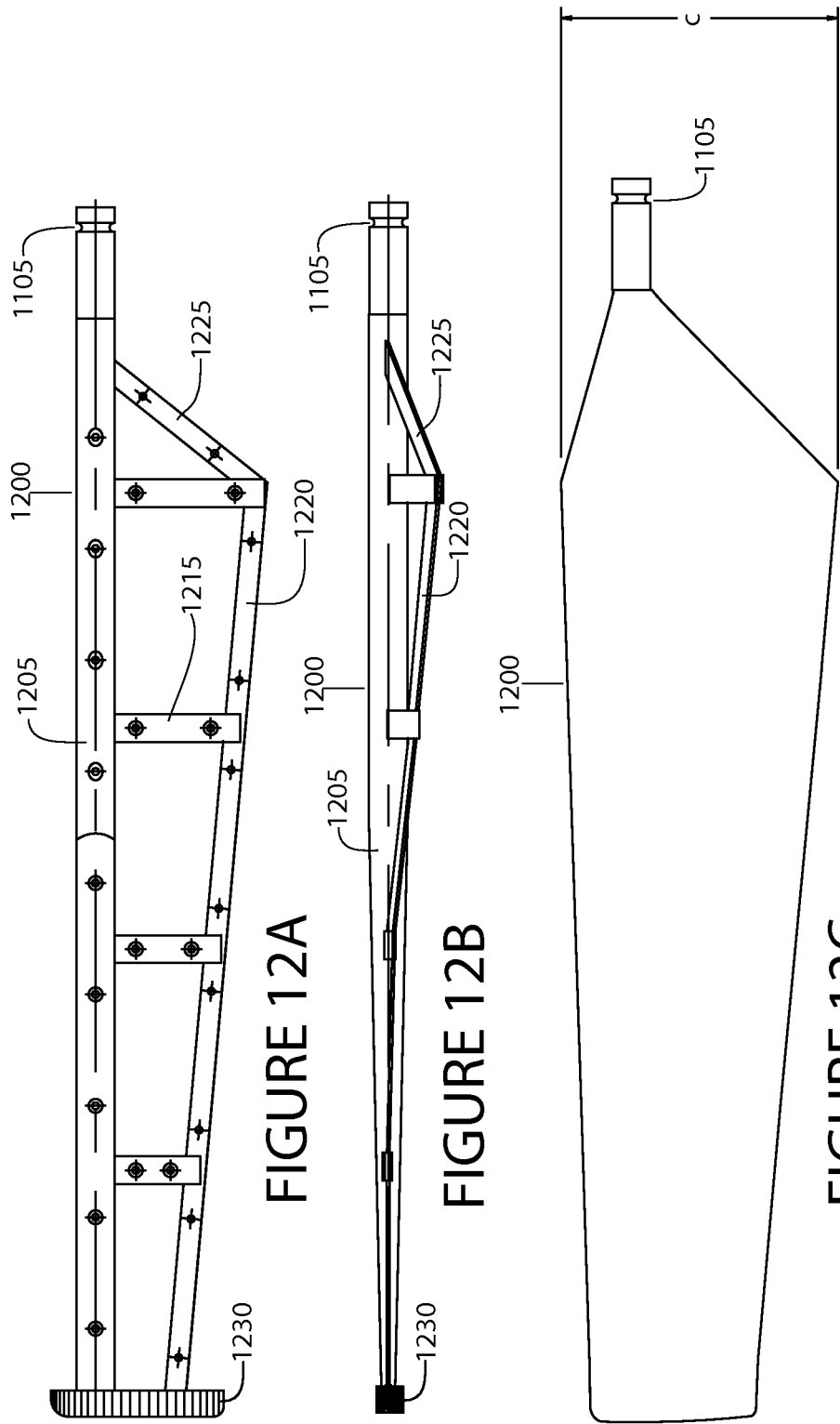

SHROUDED WIND TURBINE SYSTEM WITH YAW CONTROL

RELATED APPLICATION

This application is a continuation of U.S. patent application Ser. No. 11/845,094, filed Aug. 27, 2007 now U.S. Pat. No. 8,257,019 the entire contents of which are incorporated herein by this reference, which claims the benefit of priority of U.S. provisional application No. 60/871,135, filed Dec. 21, 2006, the entire contents of which are incorporated herein by this reference.

FIELD OF THE INVENTION

This invention generally relates to devices for use in producing electric power from wind energy, and more particularly, to an elevated shrouded wind turbine adapted for yaw movement facing the wind.

BACKGROUND

Most electricity today is generated by burning fossil fuels and producing steam which is then used drive a steam turbine that, in turn, drives an electrical generator. Unfortunately, however, the world's supply of fossil fuels is large, but finite. Exhaustion of low-cost fossil fuels will have significant consequences for energy sources as well as for the manufacture of plastics and many other things.

More serious are concerns about the emissions that result from fossil fuel burning. Fossil fuels constitute a significant repository of carbon buried deep under the ground. Burning them results in the conversion of this carbon to carbon dioxide, which is then released into the atmosphere. This results in an increase in the Earth's levels of atmospheric carbon dioxide, which enhances the greenhouse effect and contributes to global warming. Depending upon the particular fossil fuel and the method of burning, other emissions may be produced as well. Ozone, $SO_2$, $NO_2$ and other gases are often released, as well as particulate matter. Sulfur and nitrogen oxides contribute to smog and acid rain. Fossil fuels, particularly coal, also contain dilute radioactive material, and burning them in very large quantities releases this material into the environment, leading to low but real levels of local and global radioactive contamination. Coal also contains traces of toxic heavy elements such as mercury, arsenic and others. Mercury vaporized in a power plant's boiler may stay suspended in the atmosphere and circulate around the world.

An alternative source of renewable energy, solar cells, also referred to as photovoltaic cells, use the photovoltaic effect of semiconductors to generate electricity directly from sunlight. Their use has been rather limited because of high manufacturing costs. Disadvantageously, the manufacturing process also consumes considerable fossil fuels, resulting in pollution. Additionally, refined silicon required for the semiconductors is in short supply, making solar cells relatively costly. Solar electricity currently tends to be more expensive than electricity generated by other sources. Furthermore, solar energy is not available at night, may be unavailable due to weather conditions, and may be compromised during winter months; therefore, a storage or complementary power system is required for most applications.

Moreover, solar energy is inefficient. Expensive solar cells made from single crystal silicon are currently limited to about 25% efficiency because they are most sensitive to infrared light, and radiation in this region of the electromagnetic spectrum is relatively low in energy. Polycrystalline solar cells are made by a casting process in which molten silicon is poured into a mould and allowed to cool, then sliced into wafers. This process results in cells that are significantly less expensive to produce than single crystal cells, but whose efficiency is limited to less than 20% due to internal resistance at the boundaries of the silicon crystals. Amorphous cells are made by depositing silicon onto a glass substrate from a reactive gas such as silane ($SiH_4$). This type of solar cell can be applied as a thin film to low cost substrates such as glass or plastic. Thin film cells have a number of advantages, including easier deposition and assembly, the ability to be deposited on inexpensive substrates, the ease of mass production, and the high suitability to large applications. Since amorphous silicon cells have no crystal structure at all, their efficiencies are presently only about 10% due to significant internal energy losses.

Another attractive alternative source of renewable energy, wind power, produces electricity from the flow of air over the surface of the earth. Wind rotates a rotor mechanically to an electric generator to produce electricity. Unlike solar cells, properly located wind turbines can generate the energy used in its construction within just months of operation. Greenhouse gas emissions and air pollution produced by construction of a wind turbine are small and declining. There are no emissions or pollution produced by operation of a wind turbine. Modern wind turbines are almost silent and rotate so slowly (in terms of revolutions per minute) that they are rarely a serious hazard to birds. Aesthetic, landscape and heritage issues may be a significant issue for certain wind farms. However, when appropriate planning procedures are followed, these risks are minimal and should be weighed against the need to address the threats posed by climate change and the opinions of the broader community.

Unfortunately, conventional wind turbines suffer several serious shortcomings. For example, they rely exclusively on ambient wind speed. Nothing is done to accelerate the wind and thereby attempt to improve efficiency of the turbine. Known prior art wind energy systems do not include a shroud.

Another shortcoming is serviceability. Conventional rotors, blades and adjacent components are unreachable from the tower for maintenance. Mechanisms configured to retract the rotor towards a tower, or a yaw assembly configured to facilitate rotational movement of the shroud and rotor to face oncoming wind.

Yet another shortcoming is the stationary structure supporting the nacelle. While many wind turbines include yaw mechanisms to orient the nacelle into the wind, no prior art wind turbine rotates the structure supporting the nacelle. Thus the structure is stationary and typically designed with a circular or similar cross section, which exhibits similar aerodynamic properties from every angle. Such designs exhibit marginal aerodynamic performance, making the structure more prone to drag and susceptible to failure than a streamlined structure.

Still another shortcoming of conventional wind turbines is the required blade size to drive a particular generator. As conventional wind turbines do nothing to augment wind speed, power requirements are met by sizing the rotor. A large generator, of course, requires substantial power provided by a large rotor to turn. This approach ignores the relationship of wind speed to power, whereby an increased wind speed augments power output. Disadvantageously, a larger rotor increases manufacturing and construction costs, stresses on the support structure, wear and tear on bearings, and maintenance costs.

The invention is directed to overcoming one or more of the problems and solving one or more of the needs as set forth above.

SUMMARY OF THE INVENTION

To solve one or more of the problems set forth above, in an exemplary implementation of the invention a wind energy systems is provided with a shroud for each turbine. The shroud is adapted to direct and accelerate wind towards the turbine.

In one aspect of the invention, an exemplary wind turbine system includes a shroud having an entrance, throat and exit, the entrance having an entrance diameter, the throat having a throat diameter and the exit having an exit diameter, wherein the entrance diameter is greater than throat diameter. A rotor assembly includes a hub and a plurality of blades attached to the hub. The rotor assembly has a diameter less than the throat diameter and is centered at the throat of the shroud. The rotor assembly is configured to convert wind energy into rotary mechanical movement of the rotor assembly. The rotor assembly is operably coupled to a nacelle, which includes an electric generator configured to produce electric power from rotary mechanical movement. In a preferred embodiment, the plurality of blades consists of five identical blades equally spaced on the hub seventy two degrees apart. The throat diameter is 2% to 20% larger than the diameter of the diameter of the rotor assembly, allowing rotation and deflection of the rotor assembly without contact between the blades and shroud. The transition from inlet diameter to throat diameter is smooth and gradual, with a shroud pitch of 15 degrees to 60 degrees. The shroud receives wind and accelerates the received wind to a throat wind velocity, of 1.25 to 2.5 times the entrance wind velocity. A support structure supports the nacelle, rotor assembly and shroud. Each of the plurality of blades has a twist of approximately 15° to 25°, with a pitch that varies from 1° to 5° near the tip to 15° to 25° near the root, and a chord length that tapers about 75% to 33% from the root the tip.

In another aspect of the invention, a horizontal actuator for moving the nacelle is provided. The nacelle is operably coupled to the horizontal actuator and the horizontal actuator is operably coupled to the support structure. The horizontal actuator is adapted to controllably move the nacelle from a deployed operational position to a retracted maintenance position.

In a further aspect of the invention a yaw system is provided to rotate the rotor assembly, support structure and nacelle. The support structure is mounted atop the yaw system. The yaw system may include an air glide bearing turntable, a gearbox, a drive gear, and a motor. The motor drives the gear box, which drives the drive gear, which drives the turntable. A central air chamber sandwiched between the air glide bearing turntable and the base is adapted to receive pressurized gas with a lubricant sufficient to exert an upward force equal to 0.5 to 1.5 times a weight of the air glide bearing turntable plus the weight supported by the air glide bearing turntable. A gasket may be sandwiched between the air glide bearing turntable and the base. The gasket is a low friction polytetrafluoroethylene (PTFE)-based gasket.

In yet another aspect of the invention the generator includes a servo motor with a position encoder. The position encoder produces output signals corresponding to position of the input shaft. A speedup assembly has a speedup input shaft and an output speedup shaft. The output speedup shaft is adapted to rotate at about 1,500 rpm when the speedup input shaft rotates at about 30 to 60 rpm. The output speedup shaft is coupled to the motor input shaft.

BRIEF DESCRIPTION OF THE DRAWINGS

The foregoing and other aspects, objects, features and advantages of the invention will become better understood with reference to the following description, appended claims, and accompanying drawings, where:

FIG. 6 is a front plan view of an exemplary wind turbine, with a shroud, adapted for controlled yaw movement according to principles of the invention; and FIG. 6A is a profile view of an exemplary wind turbine, with a shroud, adapted for controlled yaw movement according to principles of the invention; and FIG. 6B is a profile view of an exemplary shroud with velocity vectors to conceptually illustrate how the shroud affects wind speed according to principles of the invention; FIG. 12A is a top plan view and section views of an exemplary blade according to principles of the invention; and FIG. 12B is a side plan view and section views of an exemplary blade according to principles of the invention; and FIG. 12C is a side plan view and section views of an exemplary blade according to principles of the invention.

Figure 1:
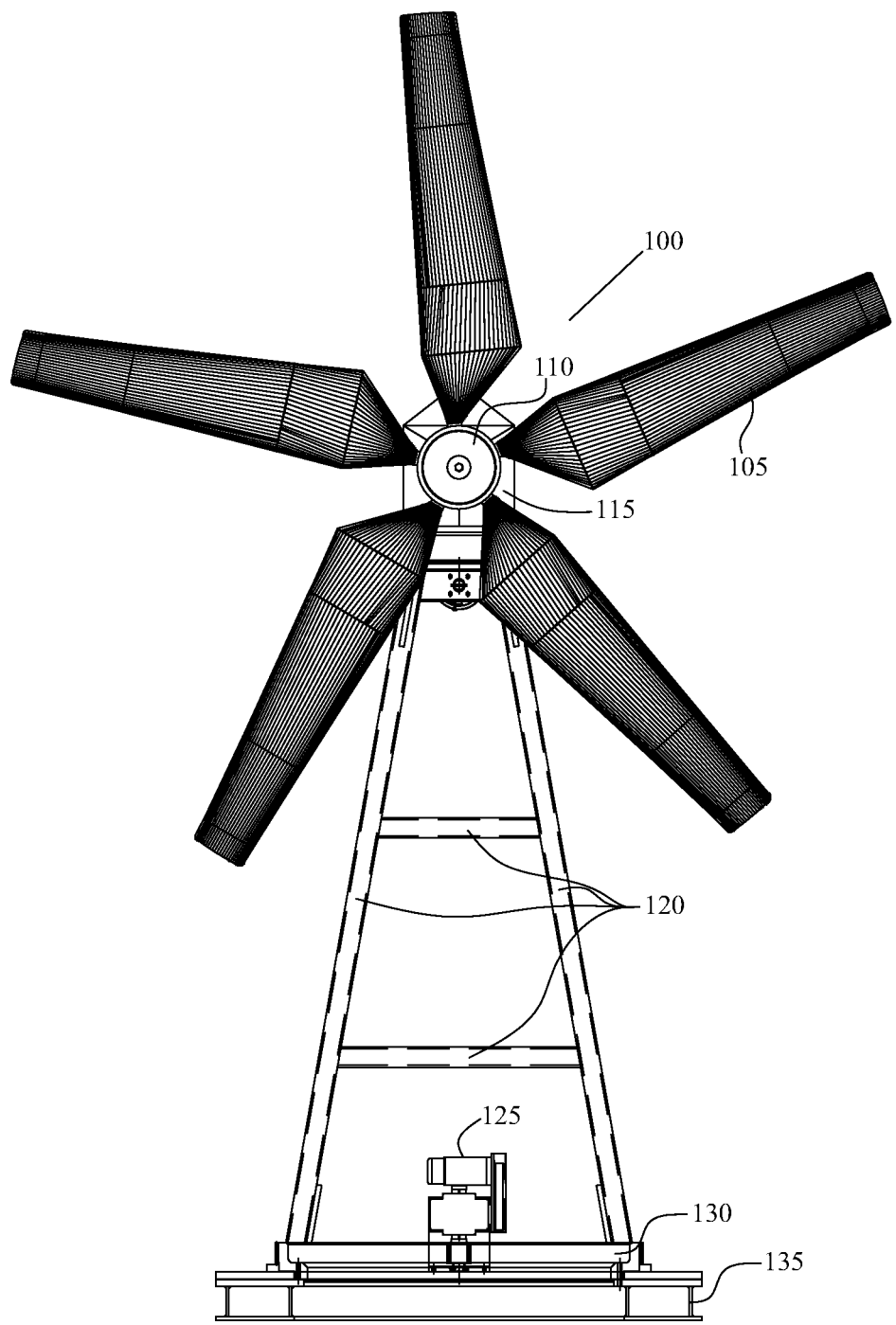
FIG. 1 is a front plan view of an exemplary wind turbine, without a shroud, adapted for controlled yaw movement according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes, ornamental aspects or proportions shown in the figures.

DETAILED DESCRIPTION

Referring to the Figures, in which like parts are indicated with the same reference numerals, various views of exemplary wind turbine systems and assemblies and components thereof according to principles of the invention are shown. An exemplary wind turbine system according to principles of the invention includes a tower construction, a yaw drive assembly, a shroud, a rotor with rotor blades, a nacelle with a drive train and miscellaneous components.

A foundation (not shown in the drawings) anchors the system to the ground. In order to guarantee stability, one or more piles and/or a flat foundation may be used, depending on the consistency of the underlying ground. A flat foundation comprises a large reinforced concrete slab which forms the footing of the generator. In a pile foundation, foundation plates (plate foundations) are fixed with piles into the earth. This is particularly necessary in soft subsoil.

A tower construction, exemplary embodiments of which are described below, carries the weight of the supported equipment, such as the support frame 120, nacelle 115 and rotor blades 105, while withstanding the huge static loads caused by the varying power of the wind. The tower construction elevates the system to a desired height, e.g., thirty feet or more above ground level. A tower construction of concrete, steel or other building materials may be used. The tower construction may be a containment structure suitable for housing equipment, a lattice or truss assembly, or other suitable stable form. In the case of concrete, the tower may be constructed on site, which simplifies transport and fitting. Alternatively, pre-cast concrete segments may be shipped and assembled on site.

Figures 2, 2A:
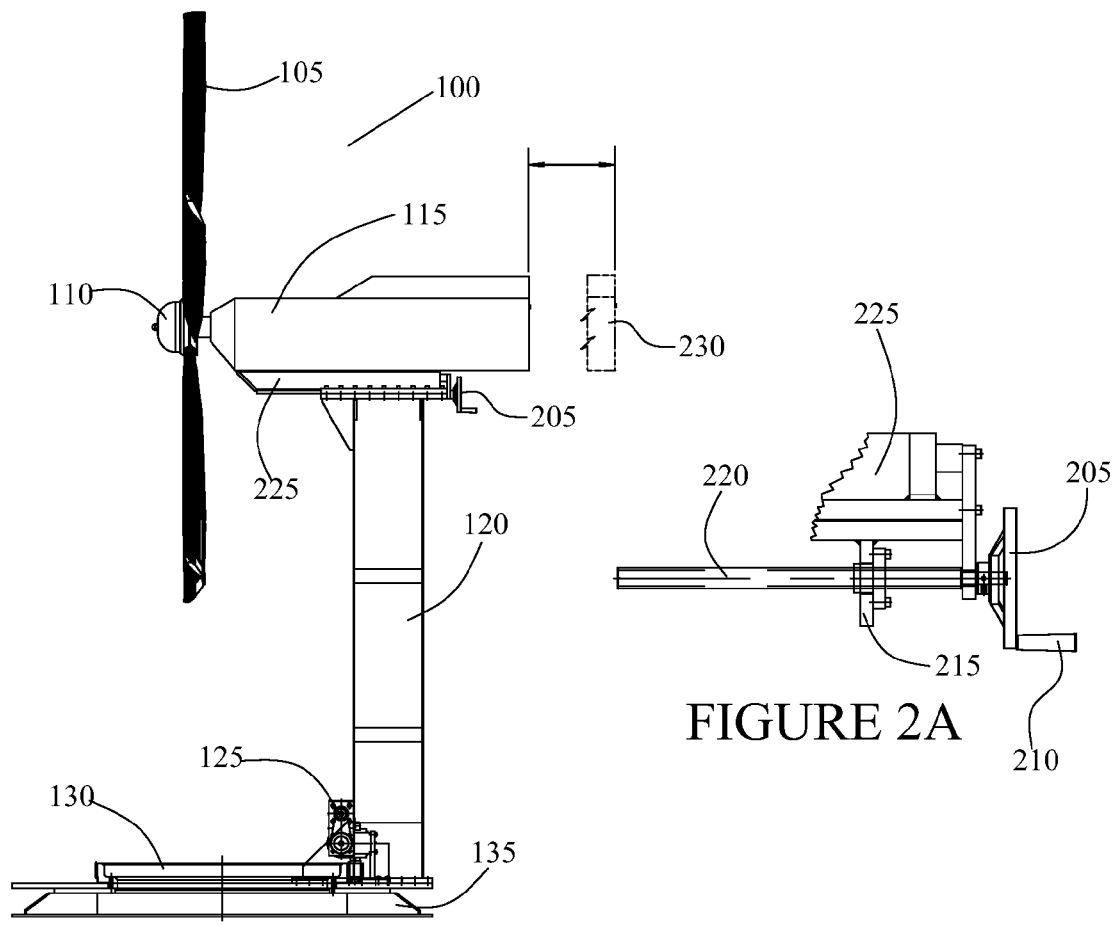
FIG. 2 is a profile view of an exemplary wind turbine, without a shroud, adapted for controlled yaw movement according to principles of the invention.
FIG. 2A is an profile view of an exemplary mechanical actuator assembly adapted for linearly moving the nacelle from an operational use position to a maintenance position according to principles of the invention.
Figure 3:
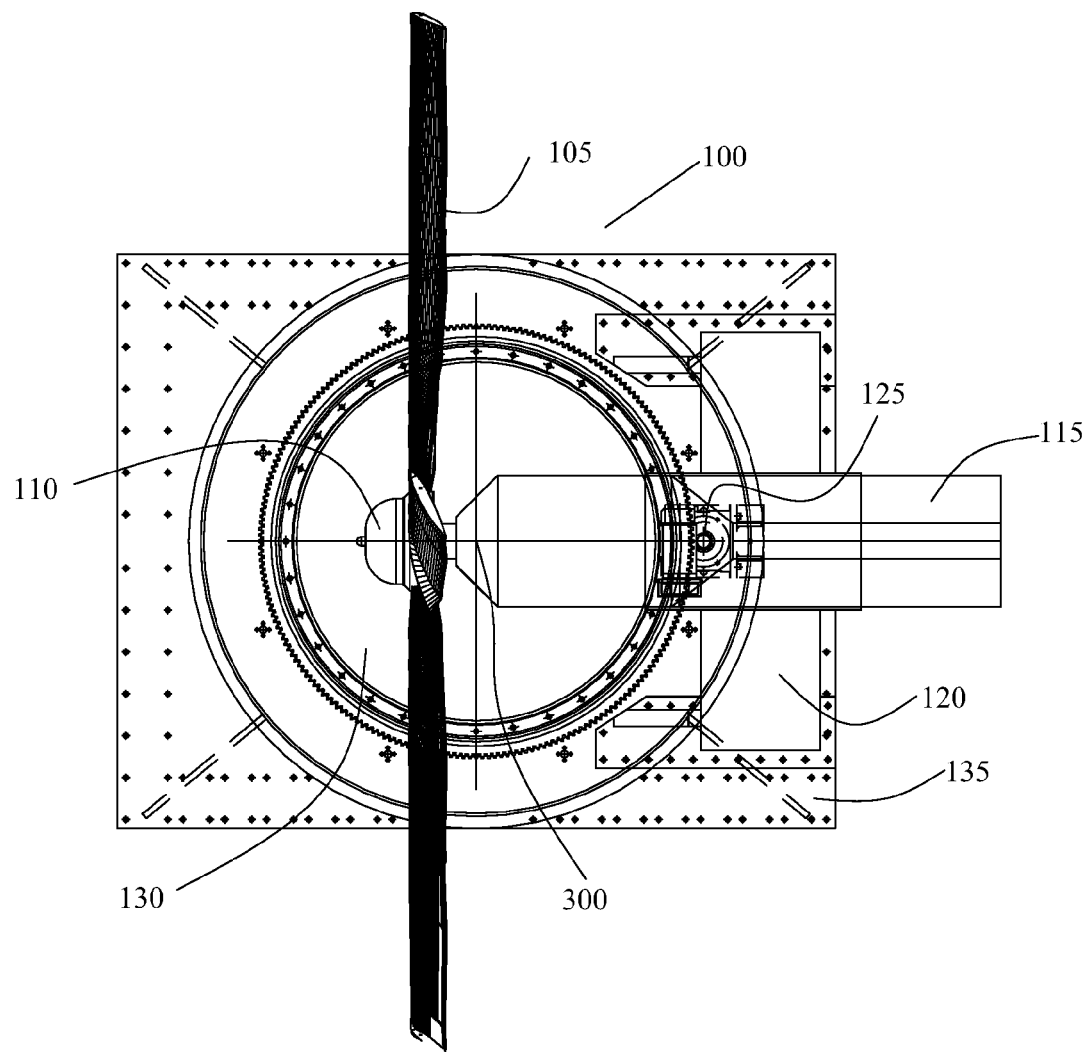
FIG. 3 is a top plan view of an exemplary wind turbine, without a shroud, adapted for yaw movement facing the wind according to principles of the invention.

Referring to FIGS. 1, 2 and 3, front plan, profile and top plan views of an exemplary wind turbine 110, without a shroud, adapted for controlled yaw movement according to principles of the invention are shown. A support structure, e.g., support frame 120, is mounted on a turntable 130 of a yaw drive assembly 135, controllably driven by a motor 125. A nacelle 115 and rotor assembly, which comprises a hub 580 and plurality (e.g., five) of rotor blades 105, are supported by the frame 120. The motor 125 may be manually actuated by a switch and/or automatically operated using a programmable logic controller, microcontroller or other control means, to maintain in a direction facing the wind.

In the exemplary embodiment, the frame 120 is comprised of a framework of beams forming a rigid A-shaped support structure. However, the invention is not limited to such a support frame. Any structure suitable for supporting the nacelle 115 and rotor assembly on the yaw drive assembly 135 may be utilized and comes within the scope of the invention. Such structures may, for example, include tubular steel, concrete post and lattice structures.

The rotor assembly, with the help of the rotor blades 105, converts the energy in the wind into rotary mechanical movement. In an exemplary implementation, a five-blade, horizontal axis rotor assembly is utilized. The rotor blades 105 may be comprised of fiber reinforced (e.g., glass, aramid or carbon-fiber reinforced) plastics (GRP, CFRP), aluminum, alloys, combinations thereof, or other suitable material. The blade profile (airfoil shape) is similar to that of an aircraft wing and uses the same aerodynamic principles to generate lift, which cause the rotor to rotate.

Figure 5:
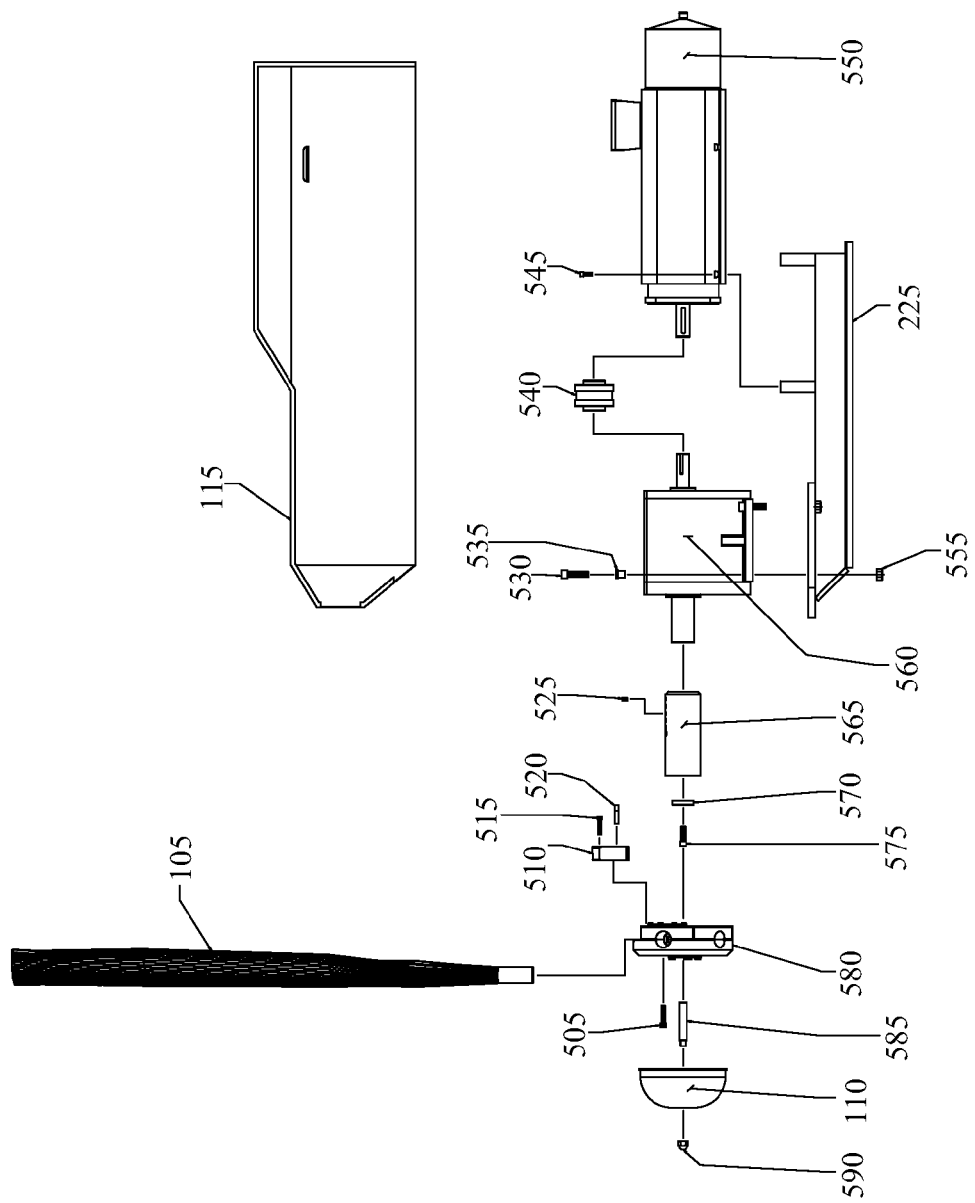
FIG. 5 is an exploded profile view of an exemplary nacelle assembly according to principles of the invention.
Figure 7A:
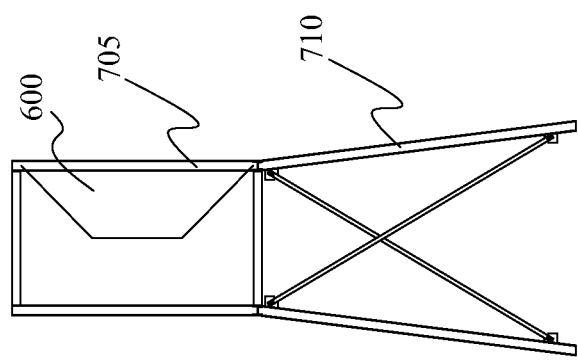
FIG. 7A is a profile view of a first exemplary truss support assembly according to principles of the invention.
Figure 7:
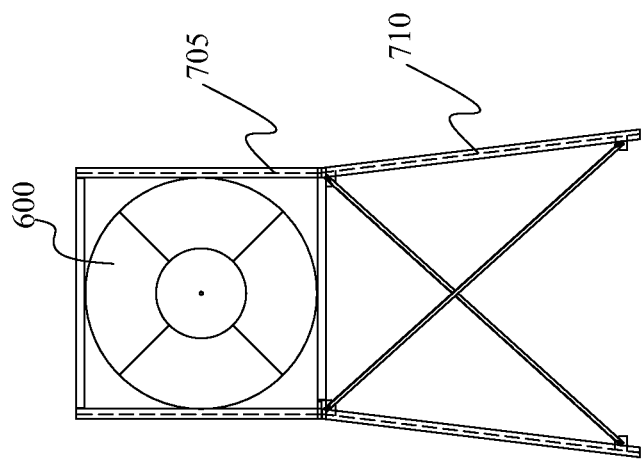
FIG. 7 is a front plan view of a first exemplary truss support assembly according to principles of the invention.
Figure 8A:
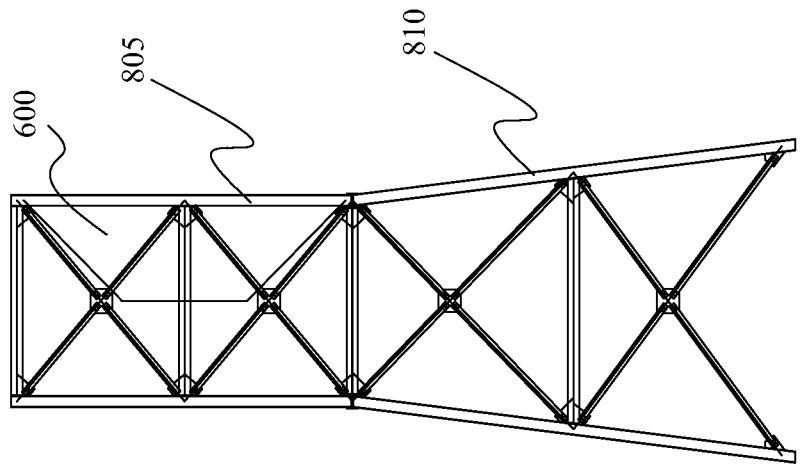
FIG. 8A is a profile view of a second exemplary truss support assembly according to principles of the invention.
Figure 8:
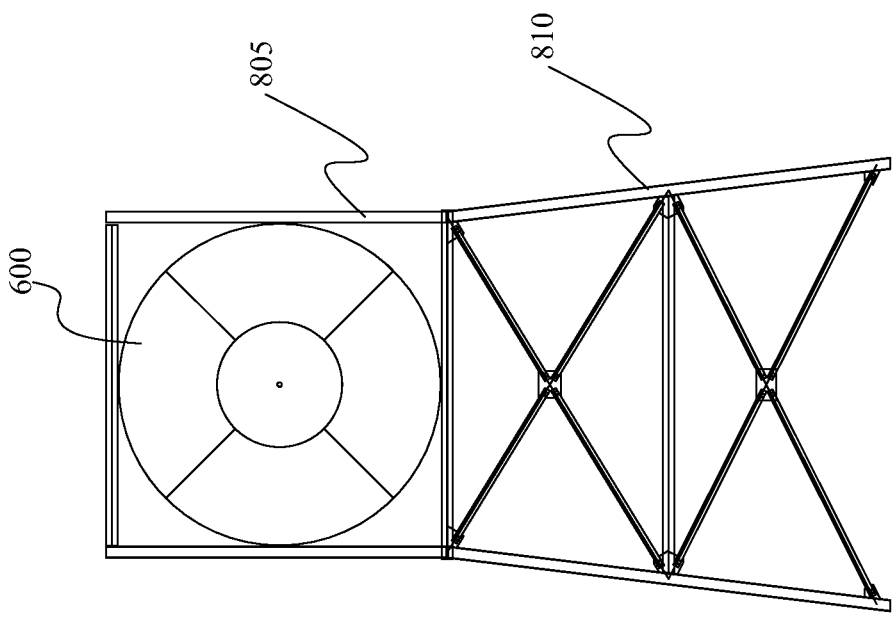
FIG. 8 is a front plan view of a second exemplary truss support assembly according to principles of the invention.
Figure 9A:
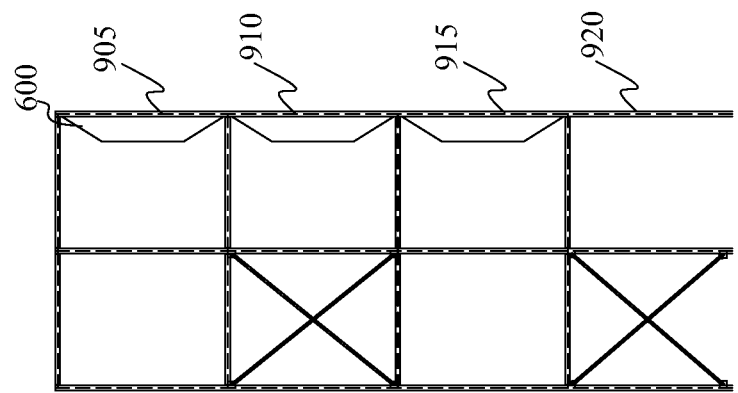
FIG. 9A is a profile view of a third exemplary truss support assembly according to principles of the invention.
Figure 9:
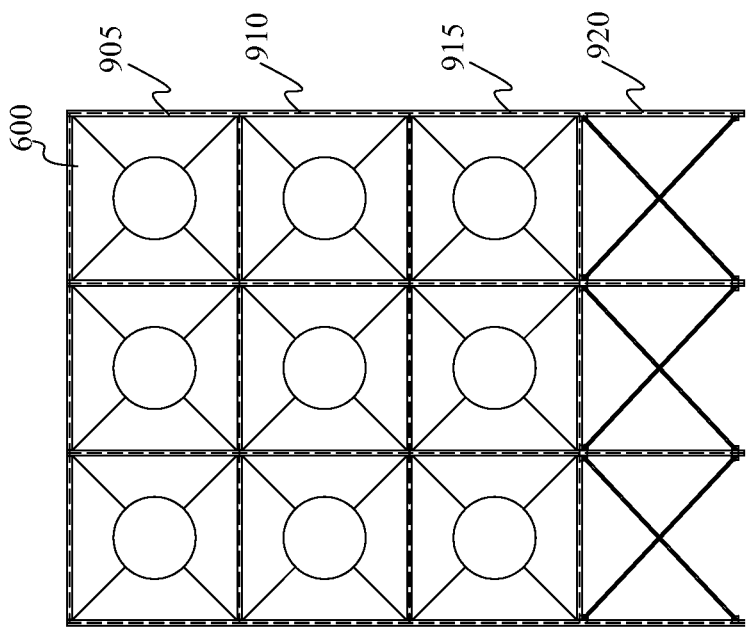
FIG. 9 is a front plan view of a third exemplary truss support assembly according to principles of the invention.

The rotor comprises multiple rotor blades 105 attached to a hub 580 (FIG. 5). The rotor converts the wind energy into a rotation. In an exemplary embodiment, the rotor has five blades, a horizontal axis, and a diameter of approximately fifteen (15) feet or more. The use of five (5) rotor blades 105 allows for a better distribution of mass than conventional two (2) or three (3) blade designs, which makes rotation smoother. A five (5) blade design also allows a smaller diameter, than conventional two (2) or three (3) blade designs that produce similar forces.

The hub 580 is the center of the rotor assembly to which the rotor blades 105 are attached. The hub 580 directs the energy from the rotor blades 105 on to the generator. If the wind turbine has a gearbox, the hub 580 is connected to the gearbox shaft, converting the energy from the wind into rotation energy. If the turbine has a direct drive, the hub 580 passes the energy directly to a ring generator. Each rotor blade 115 can be attached to the hub 580 in various ways: either in a fixed position or with pitch adjustment. A fixed hub 580 is sturdy, reduces the number of movable components that can fail, and is relatively easy to construct. Pitch adjustment enables manual or remote adjustment of blade pitch to improve efficiency.

The hub 580 thus locates and captures the five rotor blades 105. The hub 580 correctly positions the rotor blades 105 for correct tilt and angular placement. The blades are locked in position using heavy duty mechanical clamps and a locking pin. The locking pin uses two hardened pins locating in a recess in the rotor blade and further locating in the hub 580 to provide positive locking. The blades can be manually adjusted for pitch in the hub 580.

In a preferred embodiment, each individual rotor blade 115 can be infinitely adjusted manually, electromechanically or hydraulically, by turning into or out of the wind. In such an embodiment, the rotor blades may be positioned at a pitch angle suitable for generating acceptable lift, such as maximum lift, at a design wind speed (e.g., average prevailing local wind speed for the location of the turbine).

Alternatively, each individual rotor blade 115 can be adjusted automatically. Actuators for automated or remote pitch adjustment may be either hydraulic or electromechanical. In an automated embodiment, a controller monitors the turbine's power output and/or rotational speed. If the wind is too strong, the rotor blades 105 may be pitched slightly to reduce lift, so that the rotor continues to generate power at rated capacity even at high wind speeds. Otherwise, the system may maintain the rotor blades at a pitch angle suitable for generating acceptable lift, such as maximum lift, for the design or detected wind speed.

Referring now to FIGS. 2 and 2A, an exemplary horizontal actuator assembly 205 adapted for linearly moving the nacelle 115 from an operational use position to a maintenance position 230 according to principles of the invention is shown. The nacelle is operably coupled to the horizontal actuator and the horizontal actuator is operably coupled to the support structure. The horizontal actuator is adapted to controllably move the nacelle from a deployed operational position to a retracted maintenance position. Any manual or automatic linear actuator suitable for reliably moving the nacelle 115 may be utilized. By way of example and not limitation, in an exemplary embodiment, the actuator assembly 205 includes a hand wheel with a handle 210 operably coupled to a rotatable threaded lead screw 220. The leadscrew is screw specialized for the purpose of translating rotational to linear motion. The mechanical advantage of a leadscrew is determined by the screw pitch or lead. A higher performing, and more expensive, alternative is a ball screw comprising a threaded shaft that provides a spiral raceway for ball bearings which act as a precision screw. Due to inherently high static friction, the lead screw is self-locking (i.e., when stopped, a linear force on the nut will not apply a torque to the screw) thus avoiding backdriving. A threaded flange 215 (e.g., a flange with a threaded nut) coupled to the nacelle 115 by a cradle 225 receives the lead screw 220. The threaded flange 215 threadedly travels along the length of the lead screw 220 as the lead screw is rotated, thereby causing the cradle 225 to glide in a clamp rail, and consequently cause the nacelle 115 to move linearly and horizontally. The lead screw is rotatably fixed to the support frame 120. Aside from rotational motion, the lead screw 220 does not move relative to the support frame 120. The range of motion of the nacelle extends from a deployed operation position to a retracted maintenance position 230. In the maintenance position 230, the rotor blades 105 are closest to and accessible from the support frame 120. In the deployed position, the rotor blades 105 are furthest from the support frame 120. Thus, the nacelle 115 may be driven from a deployed position to a retracted maintenance position 230 by rotating the hand wheel with a handle 210. Other means for controlled horizontal linear movement of the nacelle, including (without imitation) hydraulic, pneumatic and electromechanical actuators, also come within the scope of the invention.

Figure 4:
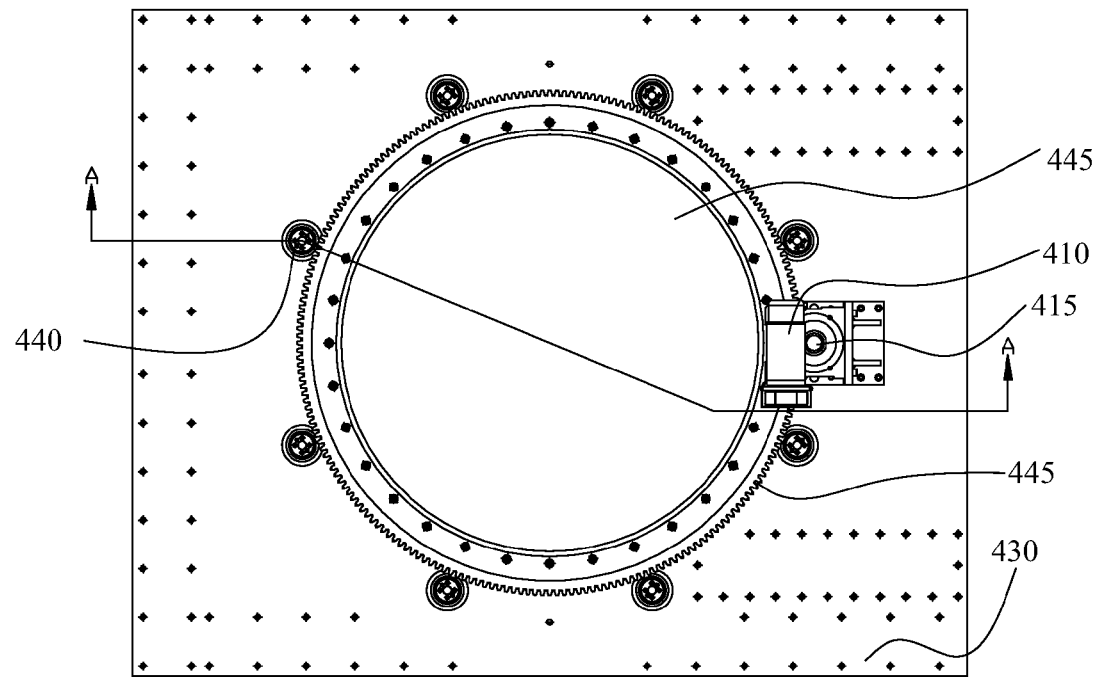
FIG. 4 is a top plan view of an exemplary tower yaw assembly adapted for yaw movement according to principles of the invention.
Figure 4A:
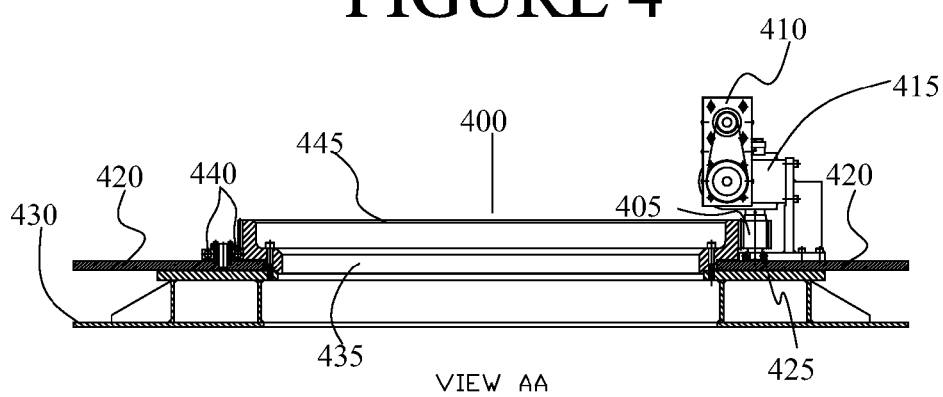
FIG. 4A is a section view of an exemplary tower yaw assembly adapted for yaw movement according to principles of the invention.

To ensure maximum power output from the generator, a wind turbine according to principles of the invention is equipped with a yaw system 400, as shown in FIGS. 4 and 4A. The yaw system 400 may also be used to better position the rotor assembly and nacelle at a position for servicing. The yaw system 400 allows the rotor assembly, nacelle and support frame to rotate (i.e., yaw) to face wind. The exemplary yaw system 400 comprises an air glide bearing turntable 445, a gearbox 415, a drive gear 405 (e.g., pinion gear) on a bearing 425, and an electric motor 410 (e.g., a servo motor controlled via a communicatively coupled PLC) as a prime mover, i.e., the ultimate source of all mechanical movement in the system. A mechanical or hydraulic braking system may be provided to prevent drift and lock the turntable securely in position when there is no yaw operation. The yaw system is mounted beneath the support frame, and may be mounted atop a tower. The motor 410 drives the gear box 415, which drives the drive gear 405. The drive gear 405 meshes, with gear teeth of a bull gear 445 coupled to the circumference of the turntable 445. Thus, rotation of the drive gear 405 causes rotation of the turntable 445. The turntable 445 is rotatably supported atop a yaw assembly support base 430 between a plurality of roller bearings 440. The roller bearings 440 maintain the turntable 445 in proper radial alignment with the pinion gear 405 and limit upward movement of the turntable 445 to prevent separation of the turntable 445 from the base 430.

To greatly facilitate rotation, the exemplary yaw system includes an air glide bearing subsystem. The air glide bearing subsystem comprises a central air chamber 435 sandwiched between the turntable 445 and base 430. A gasket 420 is sandwiched between the flanged periphery of the turntable 445 and the base 430. Compressed air with a lubricant may be pumped into the chamber 435 through an inlet port at a pressure (e.g., about 100 psi) sufficient to exert a substantial upward force, e.g., 0.5 to 1.5 the total supported weight, including the weight of the turntable. In a preferred implementation, the upward force is less than the supported weight (e.g., sum total weight of the turntable, frame, nacelle and rotor assembly), but is sufficient to offset the supported weight enough to greatly facilitate rotation without breaking the seal maintained by the gasket 420 between the turntable 445 and the base 430. In a preferred embodiment, one layer or a plurality (e.g., 2 or more) layers of a polytetrafluoroethylene (PTFE)-based gasket, such as a PTFE tape impregnated with brass or bronze (e.g., Garlock® #426 Multifil Bearing Tape), may be utilized, to maintain a high integrity low friction seal. The air glide bearing assembly 400 thus floats while controlled motion is supplied via a motor.

In an exemplary embodiment a servo motor with a 2:1 belt reduction drives a 60:1 dodge worm gear further reduced 18:1. Thus, every 6 turns of the servo motor provides 11 of rotation of the turntable. At 2,160 rpm, the servo motor will rotate the turntable 360° in one minute.

The nacelle 115 holds turbine machinery, as shown in the exemplary exploded view of FIG. 5. In the exemplary embodiment, an acorn nut 590 secures a spinner 110 to a spinner standoff 585. Hex safety bolts 505 lock blades 105 to the hub 580. A blade clamp 510 with a retaining pin 520 is secured to the hub 580 by a hex safety bolt 515. The hub is coupled to the input shaft of a speedup assembly 560 (i.e., a gearbox) via a spindle 565 with a retaining pin 525 spindle keeper 570 and head cap screw 575. A bushing 535, head cap screw 530 and nut are provided to couple the cradle 225 to the speedup assembly 560. A coupling 540 joins the keyed output shaft of the speedup assembly 560 to the keyed input shaft of the turbine assembly 550. The turbine assembly 550 employs an integral servo motor, position encoder and brake in one complete package. The integral motor design assures maximum efficiency, while keeping the overall footprint sleek and out of the air flow. A head cap screw connects the cradle 225 to the turbine assembly 550. For some embodiments, an asynchronous generator may be used. Other embodiments may use a synchronous generator. A grid connection of synchronous generator is made via a transformer, due to the fixed rotation behavior.

The speedup assembly 560 takes on the task of matching the rotation speeds of the slow-moving rotor and the fast-moving generator. By way of example, the speedup assembly 560 increases the rotation speed from 30 to 60 rpm (which is insufficient for producing electrical energy) to 1,500 rpm. The preferred speedup assembly 560 has gears generally in parallel on the input side and a planetary gear stage on the output side, thereby using fewer rotating components than a conventional system and reduces mechanical stresses and at the same time increases the technical service life of the equipment.

Advantageously, a wind turbine system according to principles of the invention may utilize conventional commercially available electronic equipment, including a generator, a system for grid in-feed of the electricity, and various sensors and controls. The system for feeding electricity into the grid depends upon the generator used. In a variable speed turbine embodiment with a synchronous generator, alternating current generated fluctuates constantly in frequency and quantity. In order for the electricity to be fed into the grid, it is converted into direct current using a rectifier, filtered and then converted back into alternating current using an inverter. Voltage is converted for connection to the level of the grid using a transformer. Sensors for monitoring and control may be provided on and in the nacelle 115 to measure wind speed and wind direction, speed of the rotors and the generator, the ambient temperature and temperature of individual components, oil pressure, pitch and azimuth angle (yaw mechanism based on the wind direction) and electrical values, as well as vibrations or vibrations in the nacelle 115. Data from sensor signals may be used to control operation. For example, in response to signals corresponding to wind direction, the yaw mechanism may be activated. An exemplary wind turbine system according to principles of the invention may also contain components lighting, cooling, heating, lightning protection, lifting gear (e.g. winches for spare parts), communications equipment and fire extinguishing equipment.

The nacelle may optionally include temperature control features. The temperatures inside a nacelle 115 can be quite high due to the waste heat from the speedup assembly and the generator. Cooling elements such as heat sinks, fans and vents may therefore be installed in the nacelle 115 to help keep it cool. Heaters may also be provided to warm up the oil in the gearbox in cold climates. Rotor blades 105 may be heated in cold climate conditions to prevent them from icing over. Anemometers and weather vanes may also be heated in cold regions to prevent them from malfunctioning.

Referring now to FIGS. 6 and 6A, front plan and profile views of an exemplary wind turbine, with a shroud, adapted for controlled yaw movement according to principles of the invention are shown. The shroud 600 comprises a forward entrance-defining portion 605, a center throat portion 610 and a rear exit-defining portion 615, with the inner surfaces of all three portions defining a circular passageway, and with each section differing in radius. Thus, the shroud comprises an axisymmetric tubular structure, converging to a minimum radius in the middle, making somewhat of an hourglass-shape, with a smooth bell shaped venturi inlet, a circular throat, and a flared exit. The diameter of the inlet, $d_i$, is larger than the throat diameter, $d_t$. The diameter of the exit, $d_e$, is also larger than the throat diameter, $d_t$, but equal to or less than the diameter of the inlet, $d_i$. The diameter of the throat 610 of the shroud, $d_t$, is slightly larger (e.g., 2% to 20% larger) than the diameter of the rotor assembly with the blades, thereby enabling the rotor with blades to be positioned in or nearby (e.g., at or slightly aft of) the throat section and allowing blade rotation and deflection without scraping or otherwise contacting the interior surface of the shroud. By way of example and not limitation, for a rotor with blades having a diameter of 15 feet, the shroud may feature a throat diameter, $d_t$, of about 17 feet, an inlet diameter, $d_i$, of about 25 feet, and an exit diameter, $d_e$, of about 20 feet. In general, the larger the ratio of inlet diameter to throat diameter, i.e., $d_i/d_t$, the greater the increase in wind speed.

To provide a smooth transition from ambient wind speed $V_i$ to throat wind speed $V_t$, the transition from inlet diameter, $d_i$, to throat diameter, $d_t$, should be smooth and gradual. Discontinuities and sudden changes in diameter facilitate early transition from laminar to undesired turbulent flow. Turbulent flow, is dominated by recirculation, eddies, unsteady vortices, increased drag due to increased boundary layer skin friction, and chaos, including low momentum diffusion, high momentum convection, and rapid variation of pressure and velocity in space and time. Thus turbulence compromises wind speed at the throat, $V_t$, and decreases overall system performance and efficiency.

To militate against the onset of turbulence, in an exemplary embodiment, the transition from inlet diameter, $d_i$, to throat diameter, $d_t$, occurs over a minimum shroud inlet length, $l_i$, equal to about 25% to 75% of the difference between inlet diameter, $d_i$, and throat diameter, $d_t$. Thus, the minimum length increases as the difference between the inlet diameter, $d_i$, and throat diameter, $d_t$ increases. In a particular exemplary embodiment, for a shroud tapering from a 25 foot inlet diameter, $d_i$, to a 17 foot throat diameter, $d_t$, a minimum shroud inlet length, $l_i$, equal to about 50% of the difference between inlet diameter, $d_i$, and throat diameter, $d_t$, i.e., 4 feet which is 50% of 8 feet, is preferred. In such an exemplary embodiment, a transition length $l_i$ of 4 feet or greater (e.g., 4.75 feet) may be used. This gradual tapering results in an acute shroud pitch, α, preferably less than 60°.

In addition, the transition to and from the throat diameter d.sub.t is smooth, gradual and curvaceous. Illustratively, the throat may feature a curved section having a radius, $r_t$, of approximately 25% to 65% of the total shroud length, $l_i+l_e$, and a center of curvature in line with the throat, as shown in FIG. 6A. In a particular exemplary embodiment, for a shroud with a total length of approximately 7 feet, a radius of curvature, $r_t$, for the throat section of approximately 2 feet may be provided.

Likewise, the transition from throat diameter, $d_t$, to exit diameter, $d_e$, should be gradual to avoid low speed transition from laminar to undesired turbulent flow dominated by recirculation, eddies and unsteady vortices. Such flow, characterized by swirling and reverse current, can offset the benefit of the accelerated incoming flow and decrease overall system performance and efficiency. In an exemplary embodiment, the transition from throat diameter, $d_t$, to exit diameter, $d_e$, occurs over a minimum shroud exit length, $l_e$, equal to about 25% to 85% of the difference between exit diameter, $d_e$, and throat diameter, $d_t$. Thus, the minimum length increases as the difference between the exit diameter, $d_e$, and throat diameter, $d_t$ increases. In a particular exemplary embodiment, for a shroud expanding from a 17 foot throat diameter, $d_t$, to a 20 foot exit diameter, $d_e$, a minimum shroud exit length, $l_e$, equal to about 75% of the difference between exit diameter, $d_e$, and throat diameter, $d_t$, i.e., 2.25 feet which is 50% of 8 feet, may be used.

The shroud 600 accelerates the flow of air passing through it. The speed of air increases as it moves from the wide entrance through the converging portion leading to the narrow throat. At or near the throat, the air velocity reaches a maximum. As the shroud cross sectional area gradually diverges from the narrow throat to the wider exit, the air expands, decelerates and exits.

FIG. 6B is a profile view of an exemplary shroud with velocity vectors to conceptually illustrate how the shroud affects wind speed according to principles of the invention. As discussed above, the shroud amplifies or increases velocity of wind driving the rotor blades. Wind flow approaches the shroud at a velocity $V_i$. As the wind travels through the entrance of the shroud and approaches the throat, it is compressed and accelerates to $V_t$. The wind velocity at the throat, $V_t$, is greater than the entrance velocity $V_i$, by a factor x, which is greater than 1.0 (e.g., 1.25 to 2.5). In a particular exemplary embodiment, x is approximately 2, meaning that wind velocity at the throat, $V_t$, is about twice the entrance velocity $V_i$. As wind power is cubically related to wind speed, a two-fold increase in wind velocity results in an eight-fold increase in energy output. Rotor blades located at or near the throat of the shroud will be subject to the higher wind velocity, thus increasing the rotational speed of the rotor. The gradual transition or expansion of air passing out to the atmosphere serves to avoid turbulence and reduce aerodynamic losses.

Referring now to FIGS. 7, 7A, 8, 8A and 9 various optional exemplary truss support tower assemblies according to principles of the invention are conceptually shown. The assemblies comprise a lattice framework of crisscrossed support members and surrounding beams. Each truss support tower assembly includes one or more elevating sections 710, 810, 920 and one or more elevated sections 705, 805, 905-915 configured to support one or more rotors, shrouds 600 and nacelles. The entire truss support tower assembly may be mounted atop and configured for yaw motion on a yaw assembly, such as the yaw assembly described above. Alternatively, each elevated section may be mounted atop and configured for yaw motion on a yaw assembly.

Figures 10A, 10B:
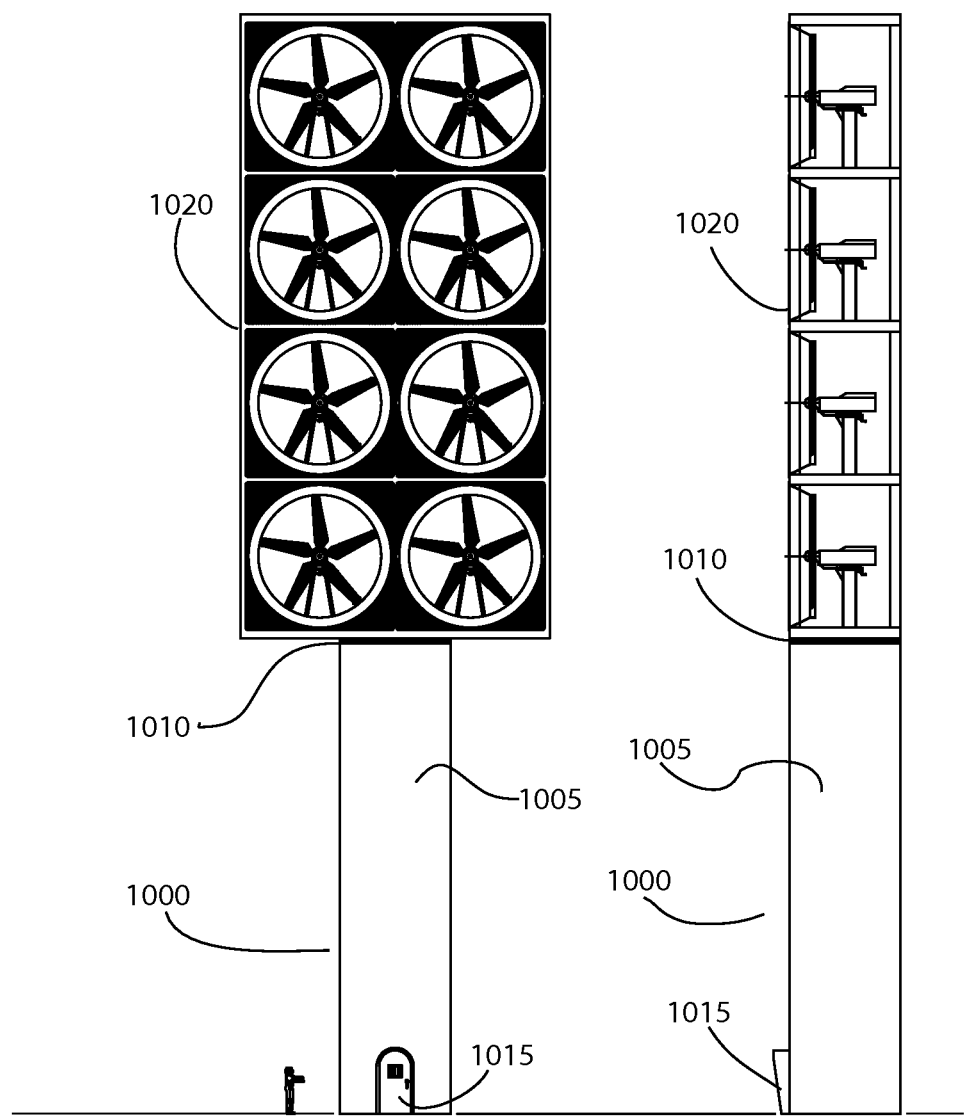
FIG. 10A is a front plan view of an exemplary concrete support structure supporting a framework comprising a plurality of wind turbines, each with a shroud, wherein the framework is adapted for controlled yaw movement according to principles of the invention.
FIG. 10B is a side plan view of an exemplary concrete support structure supporting a framework comprising a plurality of wind turbines, each with a shroud, wherein the framework is adapted for controlled yaw movement according to principles of the invention.

Of course, other support towers may be utilized. As one example, a concrete tower assembly 1000 featuring a concrete tower, such as a 60 feet tall 15 feet diameter concrete tower 1005, as shown in FIG. 10, may be provided to elevate the system to a desired height, e.g., thirty feet or more above ground level. The tower 1005 may be a containment structure suitable for housing equipment. The tower 1005 may be constructed on site, which simplifies transport and fitting. Alternatively, pre-cast concrete segments may be shipped and assembled on site. An entrance door 1015 is provided in the exemplary embodiment, to allow access to the interior by personnel and equipment. The one or more wind turbine systems 1020, including a yaw assembly 1010, may be supported on the roof of the tower construction 1005. Access to the roof may be provided through a suitable opening such as a doorway, trap door, ladder or other access means.

Figure 11:
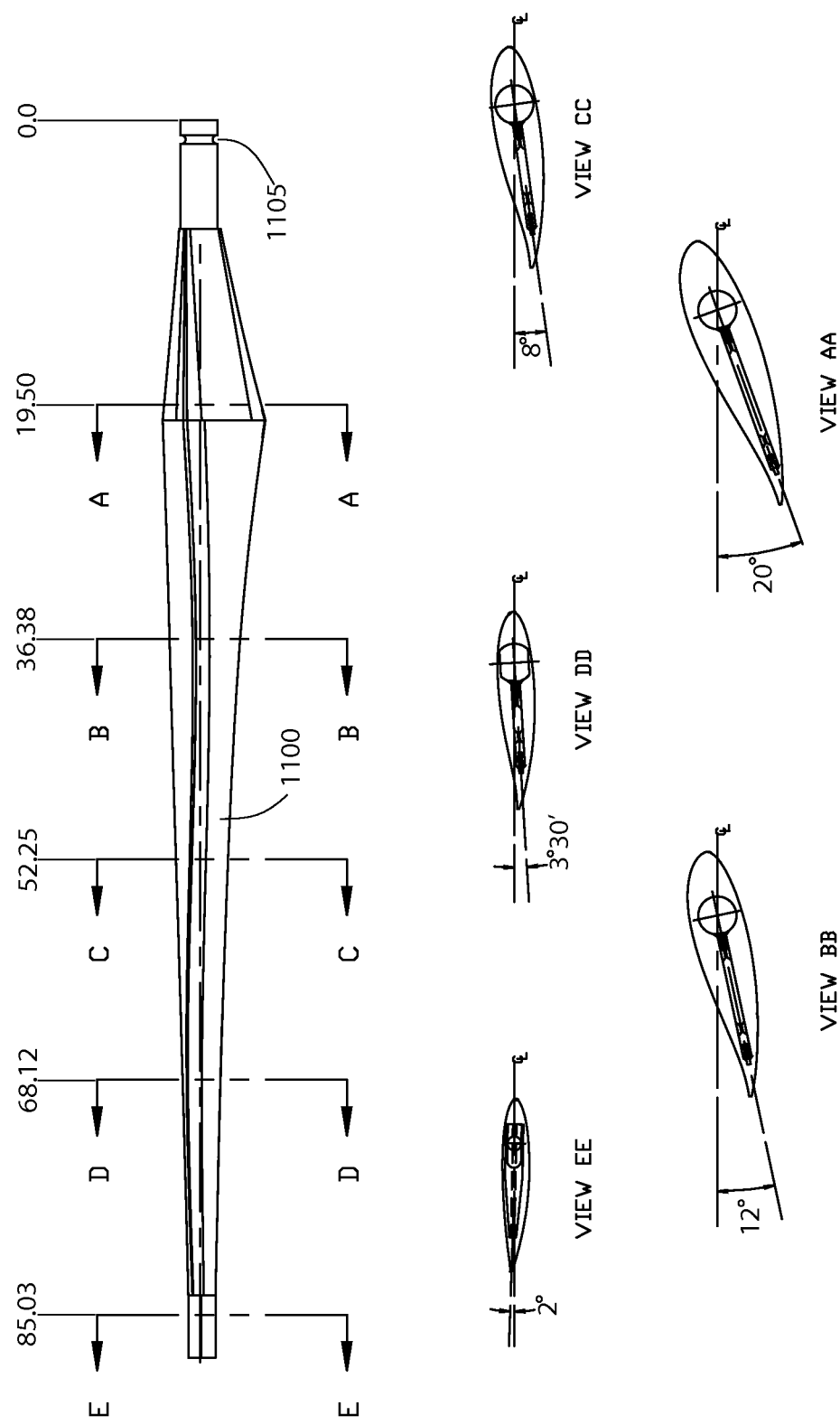
FIG. 11 is a side plan view and section views of an exemplary blade according to principles of the invention.

Referring now to FIG. 11, a side plan view and section views of an exemplary, scalable blade 1100 according to principles of the invention are shown. The blade is not limited to the dimensions or proportions shown. The mounting shaft 1105 is received by the hub of the rotor. The cross section profiles (views AA at 19.50 inches from the end of the mounting shaft, BB at 36.38 inches from the end of the mounting shaft, CC at 52.25 inches from the end of the mounting shaft, DD at 68.12 inches from the end of the mounting shaft and EE at 85.03 inches from the end of the mounting shaft) are designed to give low drag and good lift. The pitch of the cross section profiles varies from 2° near the tip (as in view EE) to 20° near the root (as in view AA), providing an overall twist of about 18°. In an exemplary embodiment a twist of approximately 15° to 25° is preferred. The twist, results in a change in the true angle of attack for the airfoil that depends on the radial location, allowing more pitch at the blade root for easier startup, and less pitch at the tip for better high-speed performance. The length of the chord, c, changes (i.e., tapers) about of about 75% to 33% along the length of the blade, from a maximum near the root (i.e., section AA having a chord of about 19.85 inches) to a minimum near the tip (i.e., section EE having a chord of about 12 inches). The airfoil shaped blade, with a rounded leading edge and sharp trailing edge, twist of approximately 15° to 25° produces lift when placed in a wind stream, and taper of about 60%. By way of example and not limitation, a blade may have a twist of approximately 15° to 25°, with a pitch that varies from 1° to 5° near the tip to 15° to 25° near the root, and a chord length that tapers about 75% to 33% from the root the tip.

Referring now to FIGS. 12A and 12B, top and side plan views of the uncovered spar 1200 over which a skin is formed to create a blade are shown. The spar comprises a thick leading edge stringer 1205 that terminates at the root with a mounting shaft 1105. A plurality of ribs 1215, an angled root stringer 1225 and a wing tip 1230 join a thin trailing edge stringer 1220 to the leading edge stringer 1205.

The spar is filled with foam and a skin is formed over the foam filled structure to form the blade 1200, as shown in the top plan view of FIG. 12C. The skin is preferably a fiber reinforced (e.g., glass, aramid or carbon-fiber reinforced) plastic. The spar is preferably aluminum or an aluminum alloy.

Preferably, wind turbines are positioned to face into the prevailing wind. In some applications, a wind turbine according to principles of the invention may use a non-rotatable, fixed base, where prevailing winds consistently blow from the same direction.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

The invention claimed is:

1. A wind turbine system comprising:
a shroud having an entrance portion configured to receive a fluid flow into the shroud, an exit portion configured to exhaust the fluid flow from the shroud, and a throat portion operatively coupling the entrance portion with the exit portion;
a rotor assembly comprising a hub and a plurality of blades operatively coupled with the hub, the plurality of blades being positioned relative to the shroud to convert energy of the fluid flow into the shroud into rotary mechanical movement of the rotor assembly;
an electric generator assembly operatively coupled with the rotor assembly and configured to convert the rotary mechanical movement of the rotor assembly into electric energy, the electric generator assembly comprising a servo motor and a position encoder; and
a sensor configured to generate a signal representative of a speed of at least one of the rotor assembly or the electric generator.

2. The wind turbine system according to claim 1, wherein the sensor comprises a position encoder.

3. The wind turbine system according to claim 1, further comprising:
a controller configured to adjust an operational parameter of the rotor assembly in accordance with the signal.

4. The wind turbine system according to claim 3, wherein the controller is configured to adjust a pitch of the plurality of blades relative to the hub in accordance with the signal.

5. The wind turbine system according to claim 4, wherein the entrance portion of the shroud has an entrance diameter, the throat portion has a throat diameter and the exit portion has an exit diameter, wherein the entrance diameter is greater than throat diameter.

6. The wind turbine system according to claim 5, wherein the throat diameter is 2% to 20% larger than the diameter of the diameter of the rotor assembly, allowing rotation and deflection of the rotor assembly without contact between the blades and shroud.

7. The wind turbine system according to claim 5, the transition from inlet diameter to throat diameter being smooth and gradual and the pitch of the shroud being 15 degrees to 60 degrees.

8. The wind turbine system according to claim 5, the shroud being adapted to receive wind having an entrance wind velocity and accelerate the received wind to a throat wind velocity, the throat wind velocity being 1.25 to 2.5 times the entrance wind velocity.

9. The wind turbine system according to claim 1, further comprising:
   a support structure; and
   a horizontal actuator operably coupled between the support structure and a nacelle housing the rotor assembly and the electric generator assembly, said horizontal actuator being adapted to controllably move the nacelle relative to the support structure from a deployed operational position to a retracted maintenance position.

10. The wind turbine system according to claim 1, further comprising:
    a support structure;
    a nacelle operably coupled with the support structure and configured to house the electric generator assembly; and
    a yaw system adapted to rotate the rotor assembly, support structure and nacelle.

11. The wind turbine system according to claim 1, further comprising:
    a support structure;
    a nacelle operably coupled with the support structure and configured to house the electric generator assembly; and
    a yaw system adapted to rotate the rotor assembly, support structure and nacelle, said support structure being mounted atop said yaw system.

12. A wind turbine system comprising:
    a shroud having an entrance portion configured to receive a fluid flow into the shroud, an exit portion configured to exhaust the fluid flow from the shroud, and a throat portion operatively coupling the entrance portion with the exit portion;
    a rotor assembly comprising a hub and a plurality of blades operatively coupled with the hub, the plurality of blades being positioned relative to the shroud to convert energy of the fluid flow into the shroud into rotary mechanical movement of the rotor assembly;
    an electric generator assembly operatively coupled with the rotor assembly and configured to convert the rotary mechanical movement of the rotor assembly into electric energy; and,
    a sensor configured to generate a signal representative of a speed of at least one of the rotor assembly or the electric generator, wherein:
    the sensor comprises a position encoder;
    the generator comprises a servo motor having a motor input shaft; and,
    the position encoder is configured to produce output signals corresponding to a position of the input shaft.

13. A wind turbine system comprising:
    a shroud having an entrance portion configured to receive a fluid flow into the shroud, an exit portion configured to exhaust the fluid flow from the shroud, and a throat portion operatively coupling the entrance portion with the exit portion;
    a rotor assembly comprising a hub and a plurality of blades operatively coupled with the hub, the plurality of blades being positioned relative to the shroud to convert energy of the fluid flow into the shroud into rotary mechanical movement of the rotor assembly;
    an electric generator assembly operatively coupled with the rotor assembly and configured to convert the rotary mechanical movement of the rotor assembly into electric energy;
    a sensor configured to generate a signal representative of a speed of at least one of the rotor assembly or the electric generator;
    a support structure;
    a nacelle operably coupled with the support structure and configured to house the electric generator assembly; and
    a yaw system adapted to rotate the rotor assembly, support structure and nacelle, said support structure being mounted atop said yaw system, wherein the yaw system comprises an air glide bearing turntable.

14. The wind turbine system according to claim 13, wherein the yaw system comprises a gearbox, a drive gear, and a motor, said motor driving the gear box, which drives the drive gear, which drives the turntable.

15. The wind turbine system according to claim 14, wherein the yaw system comprises a central air chamber sandwiched between the air glide bearing turntable and the base, and adapted to receive pressurized gas sufficient to exert an upward force equal to 0.5 to 1.5 times a weight of the air glide bearing turntable plus a weight supported by the air glide bearing turntable.

16. The wind turbine system according to claim 15, wherein the yaw system comprises a gasket sandwiched between the air glide bearing turntable and the base.

17. The wind turbine system according to claim 16, wherein:
    the central air chamber is configured to receive compressed air with a dispersed lubricant; and,
    the gasket is a polytetrafluoroethylene (PTFE)-based gasket.

18. A wind turbine system comprising:
    a shroud having an entrance portion configured to receive a fluid flow into the shroud, an exit portion configured to exhaust the fluid flow from the shroud, and a throat portion operatively coupling the entrance portion with the exit portion;
    a rotor assembly comprising a hub and a plurality of blades operatively coupled with the hub, the plurality of blades being positioned relative to the shroud to convert energy of the fluid flow into the shroud into rotary mechanical movement of the rotor assembly;
    an electric generator assembly operatively coupled with the rotor assembly and configured to convert the rotary mechanical movement of the rotor assembly into electric energy, said generator comprising a servo motor having a motor input shaft, and a position encoder adapted to produce an output signal corresponding to a position of the input shaft, and the system comprising a speedup assembly with a speedup input shaft and an output speedup shaft, said output speedup shaft being adapted to rotate at about 1,500 rpm when said speedup input shaft rotates at about 30 to 60 rpm, and said output speedup shaft being coupled with the motor input shaft; and,
    a sensor configured to generate a signal representative of a speed of at least one of the rotor assembly or the electric generator.

19. A wind turbine system comprising:
    a shroud having an entrance portion configured to receive a fluid flow into the shroud, an exit portion configured to exhaust the fluid flow from the shroud, and a throat portion operatively coupling the entrance portion with the exit portion;

a rotor assembly comprising a hub and a plurality of blades operatively coupled with the hub, the plurality of blades being positioned relative to the shroud to convert energy of the fluid flow into the shroud into rotary mechanical movement of the rotor assembly, wherein each of said plurality of blades has a twist of approximately 15° to 25°, with a pitch that varies from 1° to 5° near the tip to 15° to 25° near the root, and a chord length that tapers about 75% to 33% from the root the tip;

an electric generator assembly operatively coupled with the rotor assembly and configured to convert the rotary mechanical movement of the rotor assembly into electric energy; and, a sensor configured to generate a signal representative of a speed of at least one of the rotor assembly or the electric generator.

* * * * *